(12) United States Patent
Cahlan, II

(10) Patent No.: US 8,037,148 B1
(45) Date of Patent: Oct. 11, 2011

(54) SYSTEM AND METHOD FOR AUTHORIZING POLLING SELECTIONS

(75) Inventor: Albert E. Cahlan, II, Las Vegas, NV (US)

(73) Assignee: CSN-IP, LLC, Las Vegas, NV (US)

( * ) Notice: Subject to any disclaimer, the term of this patent is extended or adjusted under 35 U.S.C. 154(b) by 0 days.

(21) Appl. No.: 12/587,436

(22) Filed: Oct. 6, 2009

(51) Int. Cl.
*G06F 15/16* (2006.01)

(52) U.S. Cl. ........ 709/206; 709/201; 709/203; 709/204; 709/205; 709/217; 709/218; 709/219; 709/226

(58) Field of Classification Search ........ 709/201, 709/203, 204, 205, 206, 217, 218, 219, 226
See application file for complete search history.

(56) References Cited

U.S. PATENT DOCUMENTS

| | | | | |
|---|---|---|---|---|
| 4,751,630 | A * | 6/1988 | Kelley et al. | 709/231 |
| 7,197,646 | B2 * | 3/2007 | Fritz et al. | 713/182 |
| 2005/0154679 | A1 * | 7/2005 | Bielak | 705/59 |
| 2006/0031428 | A1 * | 2/2006 | Wikman | 709/220 |
| 2008/0059605 | A1 * | 3/2008 | Shalev et al. | 709/217 |
| 2008/0298386 | A1 * | 12/2008 | Fiatal | 370/449 |
| 2008/0301778 | A1 * | 12/2008 | Fritz et al. | 726/4 |
| 2009/0271287 | A1 * | 10/2009 | Halpern | 705/26 |
| 2010/0332283 | A1 * | 12/2010 | Ng et al. | 705/9 |

* cited by examiner

*Primary Examiner* — Liangche A Wang
(74) *Attorney, Agent, or Firm* — Robert Morishita; Morishita Law Firm LLC

(57) ABSTRACT

A method and system for authorizing polling selections includes a polling server communicating to user terminals, optionally through the Internet, broadcast media, or the like. A polling account is created for each user. One or more issues are identified and the user is notified. The user's identity and, optionally, membership in a polling pool are verified. The user's polling input is stored and disseminated to the public. Optionally, the polling input, or a summary or graphical representation thereof, is disseminated along with a voting record or other objectively verifiable position of a representative of the users for comparison.

3 Claims, 3 Drawing Sheets

SYSTEM AND METHOD FOR AUTHORIZING POLLING SELECTIONS

RELATED APPLICATION DATA

The present application claims the priority of U.S. Provisional Application Ser. No. 61/195,297, entitled "System and Method for Authorizing Polling Selections," filed Oct. 5, 2008 by Applicant herein.

FIELD OF THE INVENTION

The present invention relates to methods and systems for authorizing electronic transactions. More specifically, the present invention includes a method and system for authorizing polling selections, such as opinion polls, that may be broadcast or otherwise disseminated to the public.

BACKGROUND OF THE INVENTION

Information is accessible through various media. However, the quality of the information has not necessarily improved with improved access. That is, information from the desired sources with the proper verification is difficult to obtain. For example, opinion polls are subject to many constraints, some of which are somewhat contradictory, since polls need to be broad enough to obtain a representative cross-section, but focused enough to only obtain responses from those within the defined parameters of the poll. Thus, it may be difficult or impossible to obtain meaningful polling results from a representative cross-section of voters in a specific congressional district or other jurisdiction by randomly calling residents of the jurisdiction.

Similarly, it is difficult to obtain information about those representing people. Whether referring to a government official, government agency, or even a social, professional, or political organization, it is often difficult to determine the position of the person, agency, or group on a specific issue. As may be appreciated, objective information is often subjected to revision, reinterpretation, and distortion by officials, candidates, opposition candidates, agencies, organizations, or any one else with a stake in the accuracy or inaccuracy of the information. More significantly, it can be difficult or impossible for an individual to influence the position of the person, agency, or organization.

Therefore, it can be seen that there is a need for a method and system for verifying polling selections, such as opinion polls, that may be broadcast or otherwise disseminated to the public.

SUMMARY OF THE INVENTION

A system according to an embodiment of the present invention includes a polling server communicating with one or more user terminals. In a further optional embodiment, the polling server may communicate with an election agency server. In an optional embodiment, the polling server communicates with an output device that delivers data stored at the polling server (such as polling input as described below) via the broadcast medium or broadcast media. Optionally, the output device outputs data to a broadcast medium, such as a television network, Internet, radio network, or the like.

The user terminals may take many forms, such as personal computers, mobile devices, telephones, interactive television, or the like, and may communicate with the polling server in a many ways, such as via the Internet, local area network, wide area network, cellular telephone system (including instant messaging, text messaging, and the like), cable and/or satellite network system, WiFi, or the like.

A method according to an embodiment of the present invention includes creating a polling account for a user. Optionally, the polling account is identified by an account identifier such as an account number, account name, or the like.

User information is collected from the user and associated with the polling account. The user information optionally includes the information to verify the user's identity and, optionally, the user's location for polling purposes. For example, the user information could include national citizenship, birth date, name, address, telephone number(s), e-mail address, IP/ISP address or other service provider address such as satellite or cable television service provider address, identification number (such as social security, driver's license, or other ID number), voter registration information (such as jurisdictions in which the user is a registered voter), and the like. It is contemplated that "users" may include individuals or groups of individuals. For example, a user could include one or more of a representative of multiple individuals, a government official, a government agency, a political candidate, a social, professional, business, school, religious, or political organization, or the like.

In an optional embodiment, the user information is gathered through an input device at a user interface at a user terminal. As discussed in greater detail above, the user terminal could be a personal computer, mobile device, telephone, interactive television, or the like. Additionally or alternatively, the user information may be collected automatically, such as through "pinging" the user terminal to obtain the user's telephone number, IP/ISP address, or the like. Optionally, the user information is stored in a database stored in memory at a polling server.

According to a method of the present invention, an issue is identified and a poll question is formulated based on the issue. Optionally, the issue represents a policy issue on which a representative of the users is to cast a vote or take a position. In an optional embodiment, the poll question is formulated based on pre-polling to determine the form of the poll question. In an optional embodiment including pre-polling, pre-polling input may be received from users and the poll question may be formulated based on the pre-polling input.

The poll question is transmitted to users. In an optional embodiment, the poll question is transmitted through e-mail, telephone, mail, television, radio, Internet website, or the like. Optionally, the poll question is transmitted to users within a polling pool. In such an optional embodiment, the polling pool may be selected based on user information within a user's polling account.

To input polling selections, a user is verified. Verification includes verification of the user's polling account, such as through an assigned user name and password. In an optional embodiment, users are also verified to ensure that the user is a member of the polling pool. This verification may be automatic, such as by pinging the user's telephone number or IP/ISP address to determine the user's location, or manual, such as by checking membership or voting rolls.

Polling input is received from verified users and stored. Optionally, the polling input is stored in a polling database stored at the polling server. Optionally, the polling results are provided to one or more of the representative of the users, the users, and the general public. Polling selections may be output as raw data, or may be refined into polling results in graphical, textual, or other form. For example, in an optional embodiment, the polling results may be output with a comparison between polling selections for an issue and a vote by a representative of the users on the same issue. The output may be provided directly, through a broadcast medium, or through an agent, such as an election agency. In a further optional embodiment, the position or vote of the representative of the users is stored in a database such that it is accessible along with the polling input. Optionally, the polling server may be adapted to communicate or serve as a conduit for communications between users and representatives of users prior to, during, or after the time that the polling selections are collected.

DESCRIPTION

Reference is now made to the figures wherein like parts are referred to by like numerals throughout. Referring to FIGS. 1-4, the present invention includes a system for authorizing polling selections. As may be appreciated, polling selections may include advisory polling, e.g. opinion polling, as well as voting. Consequently, it is contemplated that the input received from users of the present invention may be used as information about the opinions of the users submitting the input, or may be used as actual votes that are included in an election tally. As such, it is contemplated that the input from the users may be free-form text or may require specific selections, e.g. yes or no, candidate A or candidate B, and the like.

Referring to FIGS. 1-4 a system according to the present invention includes a polling server 100. The polling server 100 communicates with one or more user terminals 102. The polling server 100 may take many different forms. In an optional embodiment, the polling server 100 is a file server that communicates with a computer network, such as the Internet.

The user terminals 102 may likewise take many different forms. For example, user terminals 102 may include personal computers, mobile devices, telephones, interactive televisions, or the like. It is contemplated that the user terminals 102 may include a mixture of types of devices, e.g. some users may use a personal computer while other users use a mobile device, telephone, and/or interactive television. Consequently, it is also contemplated that the user terminals 102 may communicate with the polling server 100 in a variety of different ways including via the Internet 104 or other forms of computer networks such as LAN, WAN, or the like, via broadcast media 106 such as television, radio, or the like, or via service providers 108 such as satellite or cable service providers, interactive television, publicly switched telephone networks, cellular telephone networks, or the like.

Figure 1:
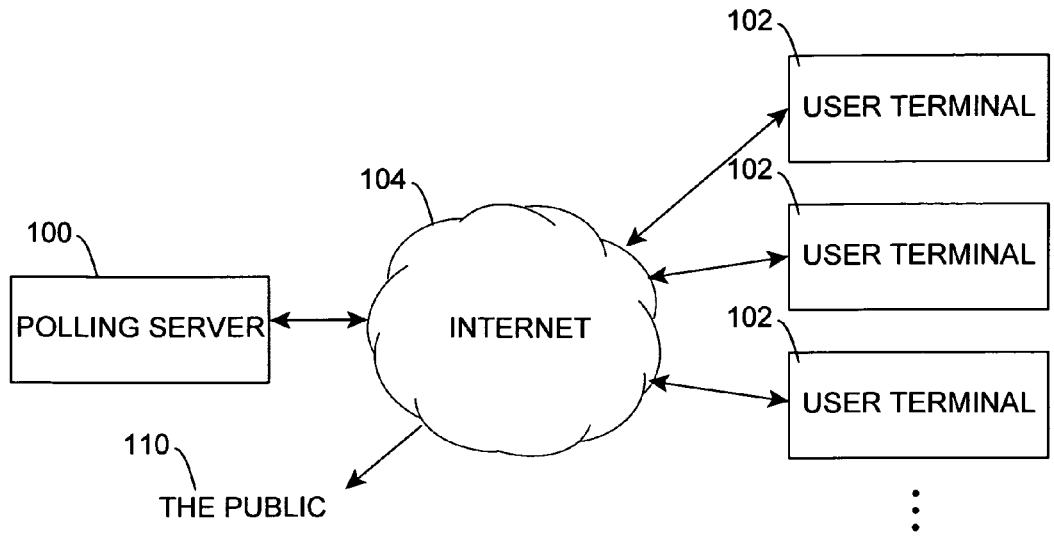
FIG. 1 is a block diagram of a system according to an embodiment of the present invention.
Figure 2:
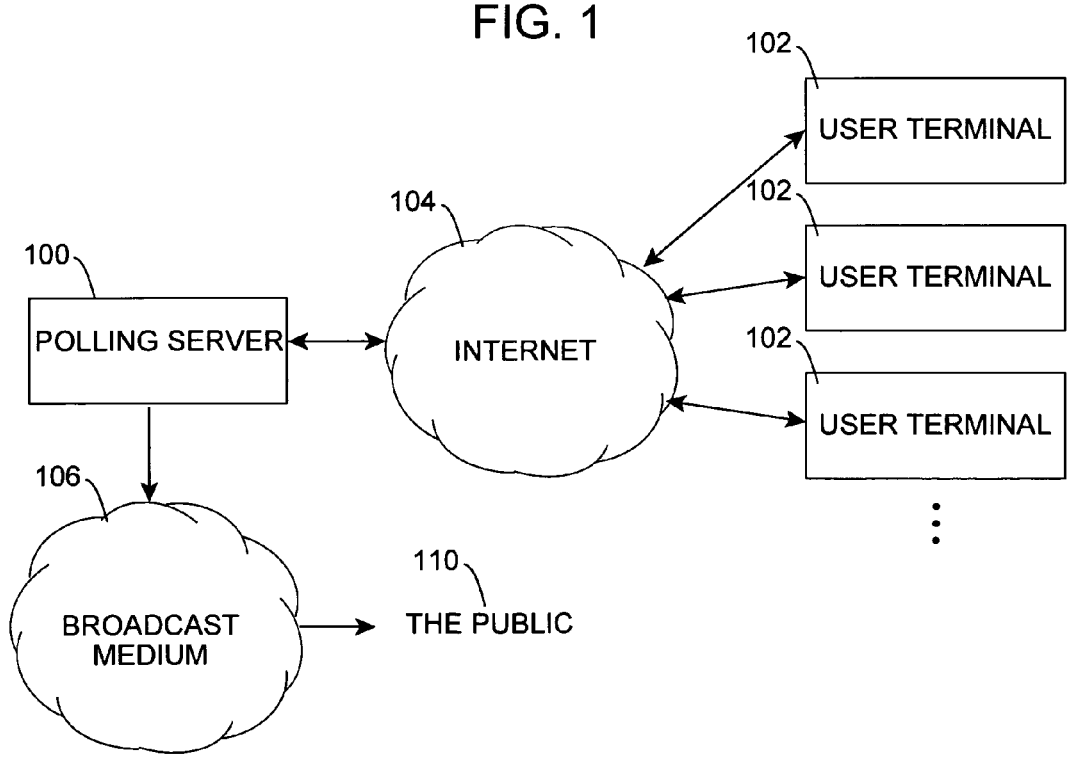
FIG. 2 is a block diagram of a system according to an embodiment of the present invention.
Figure 3:
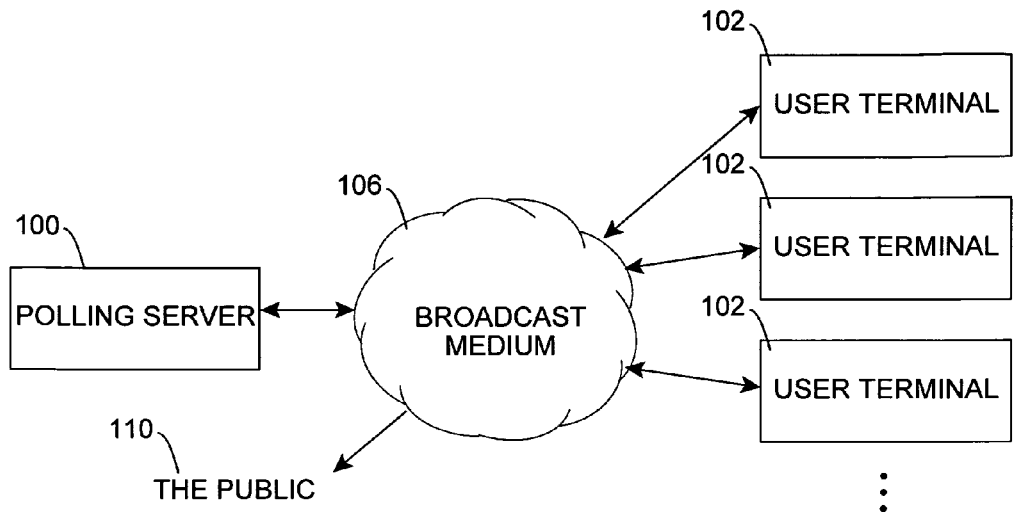
FIG. 3 is a block diagram of a system according to an embodiment of the present invention.
Figure 4:
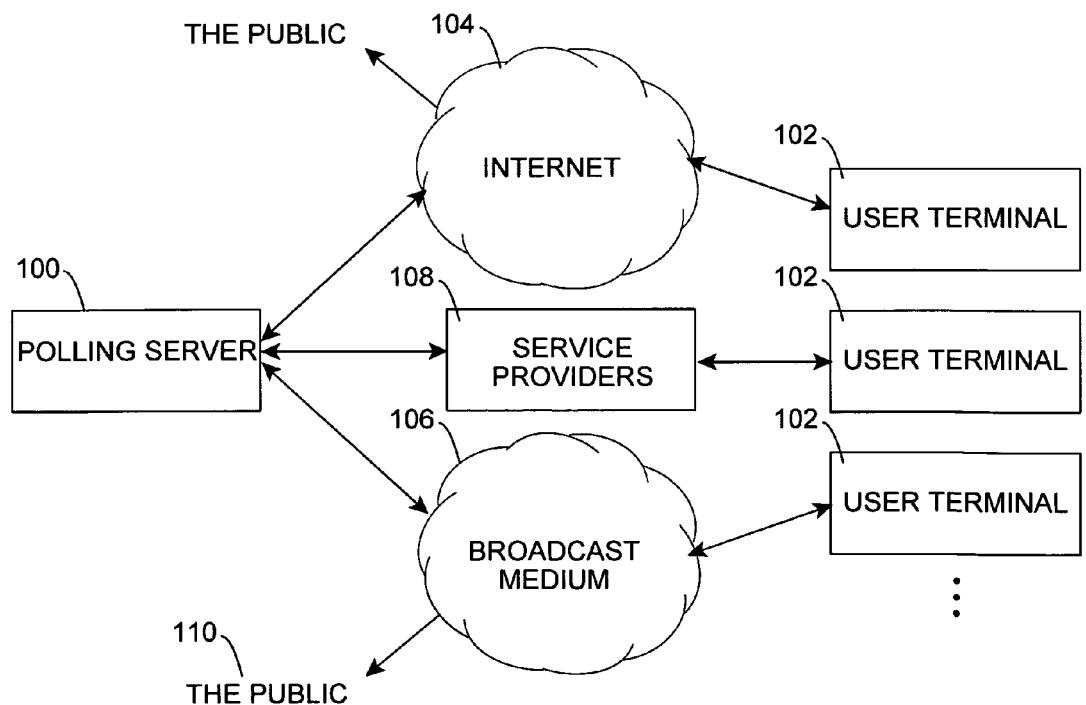
FIG. 4 is a block diagram of a system according to an embodiment of the present invention.

In an optional embodiment, the polling server 100 communicates with an output device. For example, in one optional embodiment, the polling server 100 outputs polling selections to the public 110 via a broadcast medium 106. The broadcast medium 106 may include any form, including any one or more of a video signal, audio signal, data signal, or the like. For example, in an optional embodiment the invention may communicate to the public 110 through one or more broadcast media 106 including radio, television (satellite, cable, over-the-air, closed circuit, or the like), print, Internet or other computer networking, and the like. As shown in FIG. 4, in one optional embodiment, the invention may also communicate to the public 110 through other means, such as the Internet 104.

Optionally, the broadcast medium 106 may also be used to communicate between user terminals 102 and a polling server 100. In an optional embodiment, such as that shown in FIGS. 3 and 4, the polling server 100 communicates with one or more user terminals 102 via a broadcast medium 106. In an alternate optional embodiment, such as that shown in FIGS. 1, 2, and 4, the polling server 100 communicates with the user terminals 102 in a manner other than, or in addition to, a broadcast medium 106.

Figure 5:
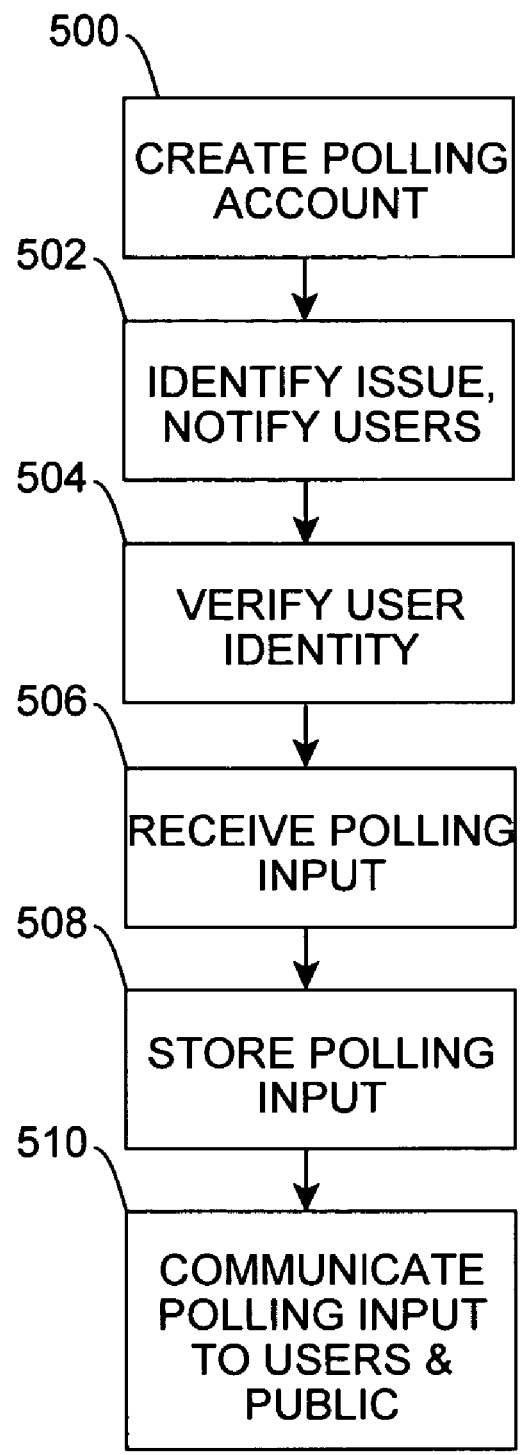
FIG. 5 is a flow chart of a method according to an embodiment of the present invention.

Referring to FIG. 5, a method according to an embodiment of the present invention includes creating 500 a polling account for a user. Optionally, the polling account is identified by an account identifier such as an account number, account name, or the like. In an optional embodiment, the polling account is, or includes, a record or other data structure storing user information. In an optional embodiment, the polling account is stored at a poll server 100.

User information for each polling account is collected from the user and associated with the polling account. The user information may be collected automatically or manually. For example, in an optional embodiment in which the user information is automatically collected, the user information may be copied from an existing record, such as a voter registration record or a driver's license record, sensed when the user requests the polling account, such as through a "pinging" the user's ISP/IP address, telephone number, or other service provider, or the like. Additionally or alternatively, user information may be received manually, such as through an input device at the user's user terminal 102.

The user information optionally includes the information to verify the user's identity and, optionally, the user's location for polling purposes. In various optional embodiments, user information could include any combination of national citizenship, birth date, name, address, telephone number(s), e-mail address, IP/ISP address or other service provider address such as satellite or cable television service provider address, identification number (such as social security, driver's license, or other ID number), voter registration information (such as jurisdictions in which the user is a registered voter), and the like. In an optional embodiment, unregistered voters are offered the opportunity to register, or in an alternate optional embodiment required to register, prior to creating a polling account.

In an optional embodiment, the user information is stored in a record associated with the polling account. In one such optional embodiment, the records are stored in a database stored in memory at a polling server 100.

Continuing with FIG. 5, an issue is identified and users are notified 502 of the issue. In one optional embodiment, users are notified via a broadcast medium 106, the Internet 104, or some other means. Users are invited to input polling selections to the polling server 100 through user terminals 102. In an optional embodiment, the identity of a user wishing to input polling selections is verified 504. For example, in one optional embodiment, the user would be verified through the information input as user information, such as a voter registration number, driver's license number, or the like. In one such optional embodiment, the identity of the user is verified by comparing the input to the user information or the voter rolls, driver's license records, or the like. In another optional embodiment, the user is assigned a user name and password or PIN when the polling account is created. In such an optional embodiment, the identity of the user could be verified by receiving an input of the user name and password or PIN and comparing the input to the user name and password or PIN stored in the associated polling account.

In a further optional embodiment, the membership of the user in the polling pool may also be verified. For example, a poll may be limited to users in a particular geographic area, or members of a particular organization, group, or political party, or the like. In such an application, an embodiment of the present invention may include verifying the membership of the user in the polling pool by entering an invitation code supplied to those being polled, entering a membership number for the organization being polled, entering location information (such as a ZIP code or telephone area code) for a geographic area being polled, or the like. In one optional embodiment, the location of a user may be verified automatically, such as by "pinging" the user's ISP/IP address, telephone number, or service provider, receiving a GPS signal, triangulating a cell signal, or using any other form of locating means. Such an optional embodiment may employ location verification to ensure that fraud has not occurred in the polling (such as by receiving polling input from someone who is outside the polling area).

After verification, users input 506 polling input including a polling selection and, optionally, a user identifier in response to a polling question on an identified issue. It is contemplated that the issue may be of a type that includes free-form alphanumeric responses (such as opinion polls) or specific selections (such as preference polls, e.g. yes or no, candidate A or candidate B, issue X or issue Y, and the like). In an optional embodiment, the polling server 100 formulates the polling question. For example, in one such optional embodiment, a pre-poll may be conducted on a polling pool or a selected sample thereof. The pre-poll may include transmitting a solicitation of opinions, positions, answers, or the like, regarding the selected issue. Using the responses to the pre-poll, the polling server may formulate a multiple choice question-and-answer set reflecting the results of the pre-poll. As may be appreciated, the pre-poll may also be used to design or select non-multiple choice questions using the responses to the pre-poll.

The polling input is stored 508 at the polling server 100. Optionally, the polling input is stored in a database stored in memory at the polling server 100. In an optional embodiment, the polling input, or a summary of the polling input, is communicated 510 to the public 110 through a broadcast medium 106, the Internet 104, or the like. As may be appreciated, the polling input may be summarized or processed (such as by creating a chart or other graphical representation) prior to communicating the polling input to the public 110. In one such optional embodiment, the polling server 100 may summarize the polling input or generate a graphical representation. In this regard, it is contemplated that the polling input (or the polling selections, where the polling input includes the polling selections plus additional information) may be output in any form to any type of output device. Thus, raw numbers (such as a percentage of the polling pool that input a particular polling selection), numbers extrapolated from the raw polling selections based on conventional statistical sampling techniques to account for the makeup of the polling pool compared to the population as a whole, numbers presented in a graph or chart, or the like. Additionally, the output may be electronic (such as a text or graphic file), hard copy, or the like.

Similarly, the polling input (or a summary or graphical representation of the polling input) may be provided to the users. In one optional embodiment, the polling input is provided to the users via the user terminals 102. For example, in an optional embodiment, a user submitting polling input via the Internet 104 using a personal computer may be enabled to access the polling input via the Internet 104 using a personal computer. Additionally or alternatively, users may be enabled to access the polling input via other means such as a broadcast medium 106 or the like.

In an optional embodiment, the issue is an issue on which a representative of the users is to vote or otherwise take a position. In one such optional embodiment, the polling input is provided to one or more of the representative of the users in addition to the users and the general public. Additionally, the polling input may be provided directly, through a broadcast medium, or through an agent, such as an election agency, which can further disseminate the information to potential voters, regardless of whether the voter participated in the polling. In a further optional embodiment, the position or vote of the representative of the users on the polled issue is stored in a database such that it is accessible along with the polling input. In this manner, the representative's positions can be compared to the polling input from the representative's constituents. Thus, in one such example, the output may include a side-by-side comparison or graphical comparison of the vote input representing a representative's votes or positions on one or more issues and the polling selections, or representations of the polling selections gathered through the polling input.

In a further optional embodiment, the polling input may represent actual votes counted in an election, referendum, voter initiative, or the like. As discussed above, the user would be verified for eligibility to participate and the user's polling selection would be received and stored at a polling server 100. In one optional embodiment, the polling server 100 may be central to all users and the tally may occur at the polling server 100.

In an alternate optional embodiment, polling input may be stored or temporarily collected at a polling server 100. The polling input may then be transferred to an official election department or agency for tally. It is contemplated that the transfer may occur in a number of ways, including through electronic communications (such as Internet or other computer network, radio transmission, cable transmission, or the like). Similarly, it is contemplated that the transfer may occur through the storage of the polling input onto a data storage device, such as an optical disc, hard drive, magnetic tape or disc, or the like, and physically transferred to an official election department or agency. In an optional embodiment in which an unregistered voter-user is offered the opportunity to register at the user terminal 102, the voter registration information may be stored at the polling server 100 and/or transferred to an election department or agency similar to the transfer of polling input.

While certain embodiments of the present invention have been shown and described it is to be understood that the present invention is subject to many modifications and changes without departing from the spirit and scope of the invention presented herein.

I claim:

1. A system comprising:
   at least one user terminal;
   a polling server in communication with said user terminal, said polling server including a data storage storing instructions executable by said polling server for authorizing and collecting polling selections comprising:

receiving user information through said user terminal at said polling server from a user;

creating a polling account for said user based on said user information, said polling account identified by an account identifier;

receiving input at said polling server identifying an issue;

said polling server formulating a poll question at said polling server based on said issue, said step of formulating comprising:

receiving an input of said issue;

transmitting said input issue to at least a portion of said users;

conducting a pre-poll comprising receiving pre-poll input from said portion of said users; and formulating a multiple choice question based on said issue using at least a portion of said pre-poll input in the possible responses to said multiple choice question;

said polling server defining a polling pool based on said issue, said polling pool including a plurality of users based on said user information;

transmitting said poll question to each user terminal associated with a user in said polling pool;

receiving polling input at through user terminal at said polling server comprising a polling selection and account identifier;

verifying the user's polling account based on said account identifier and verifying said user's inclusion in said polling pool; and recording said user's polling selection if said user's polling account and inclusion in said polling pool are verified; and an output device in communication with said polling server adapted to output said polling selections from said polling server.

2. The system of claim 1 wherein said instructions executable by said polling server further comprise:

receiving voting input based on said issue; and comparing said voting input on said issue with said polling selections;

generating a graphical representation of said comparison; and outputting said graphical representation of said comparison to said output device.

3. A system comprising:

at least one user terminal;

a polling server in communication with said user terminal, said polling server including a data storage storing instructions executable by said polling server for authorizing and collecting polling selections comprising:

receiving user information through said user terminal at said polling server from a user;

creating a polling account for said user based on said user information, said polling account identified by an account identifier;

receiving input at said polling server identifying an issue;

said polling server formulating a poll question at said polling server based on said issue, said step of formulating comprising:

receiving an input of said issue;

transmitting said input issue to at least a portion of said users;

conducting a pre-poll comprising receiving pre-poll input from said portion of said users; and formulating a multiple choice question based on said issue using at least a portion of said pre-poll input in the possible responses to said multiple choice question;

said polling server defining a polling pool based on said issue, said polling pool including a plurality of users based on said user information;

transmitting said poll question to each user terminal associated with a user in said polling pool;

receiving polling input at through user terminal at said polling server comprising a polling selection and account identifier;

verifying the user's polling account based on said account identifier and verifying said user's inclusion in said polling pool;

recording said user's polling selection if said user's polling account and inclusion in said polling pool are verified;

receiving voting input based on said issue; and comparing said voting input on said issue with said polling selections;

an output device in communication with said polling server adapted to output said comparison between said voting input and said polling selections from said polling server.

\* \* \* \* \*